United States Patent
Peterson et al.

(10) Patent No.: US 10,162,473 B2
(45) Date of Patent: Dec. 25, 2018

(54) INTEGRATING BROWSER NAVIGATION BETWEEN MULTIPLE BROWSING CONTEXTS

(71) Applicant: LENOVO (Singapore) PTE, LTD., New Tech Park (SG)

(72) Inventors: Nathan J. Peterson, Durham, NC (US); John Carl Mese, Cary, NC (US); Russell Speight VanBlon, Raleigh, NC (US); Rod D. Waltermann, Rougemont, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 239 days.

(21) Appl. No.: 14/307,297

(22) Filed: Jun. 17, 2014

(65) Prior Publication Data
US 2015/0363046 A1    Dec. 17, 2015

(51) Int. Cl.
*G06F 3/0481* (2013.01)
*G06F 9/451* (2018.01)
*G06F 9/44* (2018.01)
*G06F 17/30* (2006.01)

(52) U.S. Cl.
CPC .......... *G06F 3/0481* (2013.01); *G06F 9/4443* (2013.01); *G06F 9/451* (2018.02); *G06F 17/30899* (2013.01)

(58) Field of Classification Search
CPC .......................... G06F 3/0481; G06F 3/04842
See application file for complete search history.

(56) References Cited

U.S. PATENT DOCUMENTS

| | | | | |
|---|---|---|---|---|
| 7,673,233 B2* | 3/2010 | Moore | ............ | G06F 17/30899 715/243 |
| 9,367,211 B1* | 6/2016 | Turner | ............ | G06F 3/0483 |
| 2002/0198941 A1* | 12/2002 | Gavrilescu | ........ | G06F 17/30873 709/205 |
| 2005/0034056 A1* | 2/2005 | Rubin | ............ | G06F 17/3089 715/206 |
| 2008/0065237 A1* | 3/2008 | Long | ............ | G06F 17/30864 700/3 |
| 2008/0289029 A1* | 11/2008 | Kim | ............ | G06F 17/30905 726/12 |
| 2008/0294618 A1* | 11/2008 | Hamilton, II | ..... | G06F 17/30696 |
| 2009/0100021 A1* | 4/2009 | Morris | ............ | G06F 17/30876 |

(Continued)

FOREIGN PATENT DOCUMENTS

JP     11338810 A    * 12/1999

OTHER PUBLICATIONS

"Mozzilla Support: How Can I Ask Firefox Not to Share Cookies Between Two Different Windows, But to Share Them Between Tabs of a Same Window", posted to web at Mar. 11, 2011 at https://support.mozilla.org/en-US/791853, retrieved at Apr. 3, 2016.*

(Continued)

*Primary Examiner* — Shourjo Dasgupta
(74) *Attorney, Agent, or Firm* — Kunzler, PC

(57) ABSTRACT

A method, apparatus, and program product are disclosed for opening a second browsing context from a first browsing context, switching focus from the first browsing context to the second browsing context, and returning the focus to the first browsing context in response to receiving browser navigation input in the second browsing context.

16 Claims, 5 Drawing Sheets

(56) References Cited

U.S. PATENT DOCUMENTS

| | | | |
|---|---|---|---|
| 2009/0327947 A1* | 12/2009 | Schreiner | G06F 3/0483 |
| | | | 715/777 |
| 2010/0082673 A1* | 4/2010 | Nakano | G06F 17/3089 |
| | | | 707/776 |
| 2011/0208732 A1* | 8/2011 | Melton | G06F 17/30896 |
| | | | 707/728 |
| 2011/0271228 A1* | 11/2011 | Bederson | G06F 3/0482 |
| | | | 715/803 |
| 2013/0061160 A1* | 3/2013 | Tseng | G06F 17/30905 |
| | | | 715/760 |
| 2014/0075373 A1* | 3/2014 | Jitkoff | G06F 3/0481 |
| | | | 715/784 |
| 2014/0156648 A1* | 6/2014 | Liu | G06F 17/30867 |
| | | | 707/722 |
| 2015/0224398 A1* | 8/2015 | Jensen | G06Q 30/02 |
| | | | 463/25 |
| 2016/0253086 A1* | 9/2016 | Jiang | G06F 3/048 |

OTHER PUBLICATIONS

"Does Google Chrome Sync History Between Computers", originally posted Oct. 12, 2010 and retrieved on Sep. 28, 2017 from https://superuser.com/questions/198710/does-google-chrome-sync-history-between-computers.*

* cited by examiner

INTEGRATING BROWSER NAVIGATION BETWEEN MULTIPLE BROWSING CONTEXTS

FIELD

The subject matter disclosed herein relates to browser navigation and more particularly relates to integrating browser navigation between multiple browsing contexts.

BACKGROUND

Description of the Related Art

Information browsing applications, such as web browsers and file browsers, may provide multiple browsing contexts, such as windows, tabs, etc. Having multiple browsing contexts may be useful to be able to have a plurality of content open at the same time. Moreover, information browsers may include a navigation mechanism that allows users to navigate back and forth between previously viewed content. However, the navigation mechanism may be specific to a particular browsing context and may not be integrated or shared among multiple browsing contexts.

BRIEF SUMMARY

A method for sharing device availability is disclosed. An apparatus and computer program product also perform the functions of the method. In one embodiment, a method includes opening, by a processor, a second browsing context from a first browsing context. In another embodiment, the method includes switching focus from the first browsing context to the second browsing context. The method, in a further embodiment, includes returning focus to the first browsing context in response to receiving browser navigation input in the second browsing context.

In certain embodiments, focus is switched to the second browsing context in response to opening the second browsing context. In another embodiment, the browser navigation input received in the second browsing context comprises a back-navigation input. In certain embodiments, the second browsing context is opened in response to receiving user input in the first browsing context. In one embodiment, the user input is associated with opening a new browser context.

In certain embodiments, the method includes assigning a browsing history associated with the first browsing context to a browsing history associated with the second browsing context. In another embodiment, the method includes, in response to a forward- or back-navigation input, presenting content from an item in the browsing history assigned to the second browsing context instead of returning focus to the first browsing context. In yet another embodiment, the method includes appending a browsing history associated with the second browsing context to a browsing history associated with the first browsing context in response to returning focus to the first browsing context from the second browsing context.

In one embodiment, the method includes switching focus to the second browsing context from the first browsing context in response to receiving a forward-navigation input in the first browsing context. The method, in some embodiments, includes closing the second browsing context in response to receiving a back-navigation input. In another embodiment, the method further includes reopening the second browsing context in response to receiving a forward-navigation input in the first browsing context.

In one embodiment, the first and second browsing contexts comprise Internet browsing contexts such that website content is presented in the first and second browsing contexts. In a further embodiment, the first and second browsing contexts comprise one of a browsing window and a browsing tab within a browsing window.

An apparatus, in one embodiment, includes a processor and a memory that stores code executable by the processor. The code, in one embodiment, opens a second browsing context from a first browsing context. In another embodiment, the code switches focus from the first browsing context to the second browsing context. The code, in certain embodiments, returns focus to the first browsing context in response to receiving browser navigation input in the second browsing context.

In another embodiment, the code switches focus to the second browsing context in response to the code opening the second browsing context. In one embodiment, the code further assigns a browsing history associated with the first browsing context to a browsing history associated with the second browsing context and presents content from an item in the browsing history assigned to the second browsing context in response to the forward- or back-navigation input instead of returning focus to the first browsing context.

In certain embodiments, the code further appends a browsing history associated with the second browsing context to a browsing history associated with the first browsing context in response to returning focus to the first browsing context from the second browsing context. In some embodiments, the code further switches focus to the second browsing context from the first browsing context in response to receiving a forward-navigation input in the first browsing context.

In one embodiment, the code further closes the second browsing context in response to receiving the browser navigation input, which may comprise a back-navigation input. In certain embodiments, the code further reopens the second browsing context in response to receiving a forward-navigation input in the first browsing context.

A computer program product is provided that, in one embodiment, includes a computer readable storage medium that stores code executable by a processor to perform operations. In one embodiment, the operations include opening a second browsing context from a first browsing context. In another embodiment, the operations include switching focus from the first browsing context to the second browsing context. In a further embodiment, the operations include returning focus to the first browsing context in response to receiving browser navigation input in the second browsing context. In one embodiment, the browser navigation input comprises a back-navigation input.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
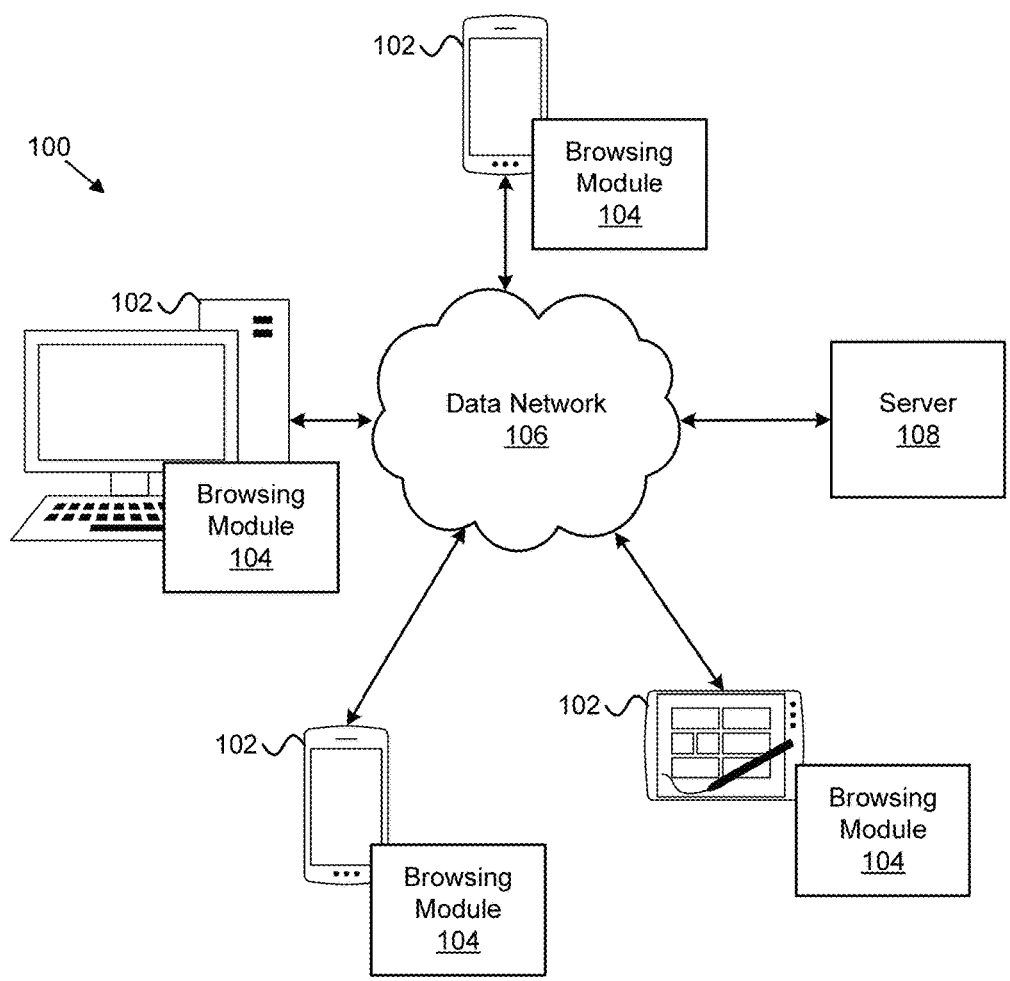
FIG. 1 is a schematic block diagram illustrating one embodiment of a system for integrating browser navigation between multiple browsing contexts.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts a system 100 for integrating browser navigation between multiple browsing contexts. In one embodiment, the system 100 includes a plurality of information handling devices 102, one or more browsing modules 104, a network 106, and a server 108, which are described in more detail below. Even though a certain number of information handling devices 102, browsing modules 104, data networks 106, and servers 108 are depicted in FIG. 1, any number of these elements may be present in the system 100.

In one embodiment, the system 100 includes a plurality of information handling devices 102. In certain embodiments, an information handling device 102 includes an electronic device comprising a processor and memory, such as a desktop computer, a laptop computer, a smart phone, a tablet computer, a smart TV, an eBook reader, a smart watch, an optical head-mounted display, and/or the like. In one embodiment, two or more information handling devices 102 are communicatively connected using the data network 106. In certain embodiments, the information handling devices 102 include one or more browsing applications, such as Internet browsers (e.g., Chrome® by Google® of Mountain View, Calif., Firefox® by Mozilla® of Mountain View, Calif., Internet Explorer® by Microsoft® of Redmond, Wash., and/or the like), file browsers, and/or the like.

In certain embodiments, the information handling devices 102 receive input from one or more input devices, such as a touch-enabled display, a physical keyboard, a microphone, a digital camera, and/or the like, which allow a user to interact with the information handling device 102. In some embodiments, the information handling devices 102 include one or more sensors that detect various contexts, inputs, or the like, such as proximity sensors, location sensors, motion sensors, biometric sensors, and/or the like.

In one embodiment, the system 100 includes one or more browsing modules 104 that integrate browsing navigation among multiple browsing contexts. In certain embodiments, the browsing module 104 includes a plurality of modules to perform the operations of opening a second browsing context from a first browsing context, switching focus from the first browsing context to the second browsing context, and returning focus to the first browsing context in response to receiving a navigation input in the second browsing context. The browsing module 104, and its associated modules, are described in more detail below with reference to FIGS. 2 and 3.

In certain embodiments, the system 100 includes a data network 106. The data network 106, in one embodiment, is a digital communication network that transmits digital communications related to an automated messaging response system 100. The data network 106 may include a wireless network, such as a wireless cellular network, a local wireless network, such as a Wi-Fi network, a Bluetooth® network, and the like. The data network 106 may include a wide area network ("WAN"), a storage area network ("SAN"), a local area network ("LAN"), an optical fiber network, the internet, or other digital communication network. The data network 106 may include two or more networks. The data network

106 may include one or more servers, routers, switches, and/or other networking equipment. The data network 106 may also include computer readable storage media, such as a hard disk drive, an optical drive, non-volatile memory, random access memory ("RAM"), or the like.

The system 100, in another embodiment, includes a server 108. The server 108, in some embodiments, includes a main frame computer, a desktop computer, a laptop computer, a cloud server, a virtual server, and/or the like. In one embodiment, the information handling device 102 is communicatively coupled to the server 108 through the data network 106. In some embodiments, the server 108 stores data that may be accessed by an information handling device 102 through the data network 106. For example, the server 108 may store files comprising websites, documents, images, videos, sound files, and/or the like.

Figure 2:
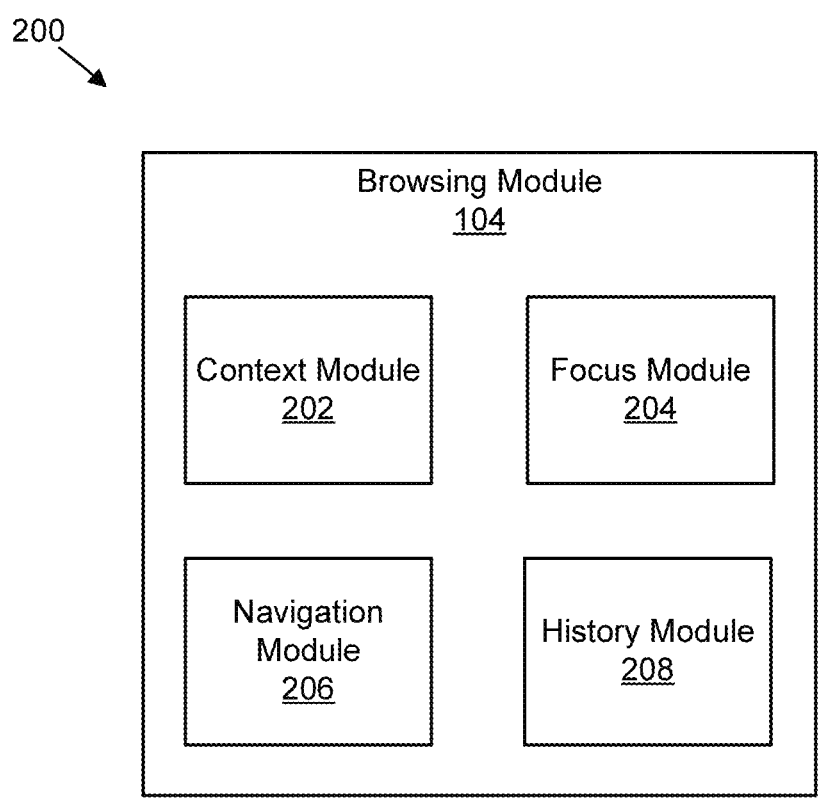
FIG. 2 is a schematic block diagram illustrating one embodiment of a module for integrating browser navigation between multiple browsing contexts.

FIG. 2 depicts one embodiment of a module 200 for integrating browser navigation between multiple browsing contexts. In one embodiment, the module 200 includes an embodiment of a browsing module 104. The browsing module 104, in certain embodiments, includes a context module 202, a focus module 204, a navigation module 206, and a history module 208, which are described in more detail below.

The context module 202, in one embodiment, opens a second browsing context from a first browsing context. As used herein, a browsing context comprises an application, program, interface, and/or the like that may be used for retrieving, presenting, and/or traversing data, files, webpages, and/or the like. In one embodiment, the first browsing context comprises an Internet browsing context. For example, the first browsing context may comprise an application configured to access and display webpages, such as an Internet browser. In some embodiments, the first browsing context comprises an application for browsing files, images, videos, music, and/or the like. In certain embodiments, the data presented in the first and second browsing contexts is stored on the server 108.

The second browsing context, in certain embodiments, is substantially similar to the first browsing context. For example, both the first and second browsing contexts may comprise Internet browsing contexts. In one embodiment, the second browsing context is a different browsing context than the first browsing context. For example, the first browsing context may comprise an Internet browser and the second browsing context may comprise a file system browser. In some embodiments, the first and second browsing contexts comprise a browsing window, a browsing tab within a browsing window, or the like.

In one embodiment, the context module 202 opens the second browsing context from the first browsing context in response to receiving user input in the first browsing context. In certain embodiments, the user input is associated with opening a new browser context. For example, in one embodiment, the context module 202 may open a new Internet browsing tab in response to a user clicking on a hyperlink on a webpage displayed in the first browsing context. In another example, the context module 202 may open the second browsing context in response to a user dragging a file from a first browsing context in a file browser to a designated area in the file browser such that when the user drops the file in the designated area, the context module 202 opens the file in a second browsing context. In a further example, the context module 202 may display the contents of a file, such as an image, in a second browsing context in response to a user double-clicking the file in the first browsing context.

The context module 202 may open the second browsing context in a new browsing window, a new browsing tab within a browsing window, or the like. In some embodiments, the context module 202 opens the second browsing context in the same browsing context as the first browsing context. For example, if the first browsing context is a tabbed browsing context, the context module 202 may open the second browsing context in a tabbed browsing context. In some embodiments, the context module 202 opens the second browsing context in a default browsing context as determined by the browsing application. For example, if the default browsing context for a file browser is a new browsing window instead of browsing tabs within a browsing window, the context module 202 may open the second browsing context in a new browsing window.

In one embodiment, the focus module 204, switches focus from the first browsing context to the second browsing context. As used herein, a browsing context has focus when it is selected to receive input, such as from a touch screen, a mouse, a keyboard, or another input device. In one embodiment, the focus module 204 maintains focus within the first browsing context after the context module 202 opens the second browsing context. In some embodiments, the focus module 204 switches focus from the first browsing context to the second browsing context in response to the context module 202 opening the second browsing context. For example, the focus module 204 may switch the focus from the first browsing context to the second browsing context after a user clicks on a hyperlink in the first browsing context that opens in the second browsing context.

The navigation module 206, in one embodiment, receives a browser navigation input within a browser context. As used herein, a navigation input comprises an input received to navigate a network of information resources, such as a network of webpages (e.g., the World Wide Web), a file directory, a network of documents, or the like. In some embodiments, the browser navigation input comprises user input, system input, or the like.

In certain embodiments, the browser navigation input comprises a back-navigation input or a forward-navigation input. For example, as an illustration of how the back- and forward-navigation input functions in the context of a single browsing context in an Internet browser, if a user clicks on a link in a current webpage to open a new webpage associated with the link within the same browsing context, the navigation module 206 may present the previous webpage in response to a back-navigation input, i.e., take the user back to the previous page where the link was clicked. Similarly, in the same example, after visiting the new webpage and going back to the original webpage, the navigation module 206 may present the new webpage again in response to a forward-navigation input, instead of the user clicking on the link again to open the webpage. As discussed below with reference to the history module 208, a list of the user's visited websites, including the order that they are visited, may be maintained in a browsing history.

In one embodiment with multiple browsing contexts, the navigation module 206 returns focus to the first browsing context in response to receiving browser navigation in the second browsing context. In particular, the navigation input may comprise a back-navigation input. For example, after the context module 202 opens the second browsing context and the focus module 204 switches focus to the second browsing context, the navigation module 206 notifies the focus module 204 to return focus back to the first browsing context in response to the back-navigation input, which may be unlike traditional browsing contexts.

Traditionally, when a new browsing context is opened, there is no navigation information associated with the new browsing context. Thus, a back-navigation input does not do anything because there is nothing associated with the back-navigation input of the new browsing context. The browsing module 104, as described herein, provides a mechanism to navigate back to the first browsing context from the second browsing context in response to the back-navigation input, even after the second browsing context is newly opened.

In one embodiment, the navigation module 206 closes the second browsing context in response to receiving the back-navigation input in the second browsing context. For example, in response to a user clicking the "back" button in a web browser for a second browsing tab, which may have been opened from a first browsing tab, the navigation module 206 may close the second browsing tab and notify the focus module 204 to return focus to the first browsing tab instead of simply leaving the second browsing tab open and switching focus to the first browsing tab.

In a further embodiment, the navigation module 206 switches focus, or notifies the focus module 204 to switch focus, back to the second browsing context from the first browsing context in response to receiving a forward-navigation input in the first browsing context. For example, the navigation module 206 may switch focus from a first web browsing tab to a second web browsing tab that was opened from the first web browsing tab in response to the "forward" navigation button being clicked. In some embodiments, if the second browsing context has been closed, the navigation module 206 may reopen the second browsing context in response to receiving a forward-navigation input in the first browsing context. In certain embodiments, the navigation module 206 sends a request to the context module 202 to reopen the second browsing context in response to receiving the forward-navigation input.

In one embodiment, the history module 208, maintains a browsing history for a browsing context. In some embodiments, the history module 208 maintains a plurality of browsing histories associated with a plurality of browsing contexts. As used herein, the browsing history comprises a list, collection, or the like of content that has been viewed within a browsing context, such as a plurality of websites, files, images, or the like.

In one embodiment, the history module 208 assigns or copies a browsing history associated with the first browsing context to the browsing history associated with the second browsing context. In one embodiment, the history module 208 assigns the history for the first browsing context to the history of the second browsing context in response to the context module 202 opening the second browsing context. In certain embodiments, the navigation module 206 presents an item from the history assigned to the second browsing context in response to receiving a back- or forward-navigation input instead of returning focus to the first browsing context.

For example, a browsing history for the first browsing context may comprise three webpages visited by a user. In response to the context module 202 opening a new browsing tab from within the first browsing context, in response to user input for example, the history module 208 may copy the history for the first browsing context to the history of the second browsing context. In one embodiment, even though the history for the first browsing context has been copied to the second browsing context, if the content of the first browsing context has not changed when the navigation module 206 receives a back-navigation input for the second browsing context, the focus module 204 may change the focus from the second browsing context to the first browsing context instead of presenting content for an item in the second browsing context's history. In such an embodiment, the navigation module 206 may close the second browsing context in response to the back-navigation input and notify the focus module 204 to return focus to the first browsing context.

In another embodiment, after the history module 208 copies the history of the first browsing context to the history of the second browsing context, if the content of the first browsing context changes, e.g., if a user visits a new website, the history module 208, in response to a back-navigation input in the second browsing context, may present content for an item in the second browsing context's history. Thus, in some embodiments, a back-navigation received by the navigation module 206 in the second browsing context may load a history item, as copied to the second browsing context from the first browsing context by the history module 208, or may trigger the navigation module 206 to close the second browsing context and the focus module 204 to return focus to the first browsing context.

In a further embodiment, in response to the second browsing context being closed, the history module 208 appends or merges the second browsing context's history into the first browsing context's history. For example, after the context module 202 opens the second browsing context in a web browser, if a user visits one or more new websites within the second browsing context, and then closes the second browsing context, the history module 208 may append the browsing history of the second browsing context, and in particular the information for the new websites that were visited, to the end of the browsing history for the first browsing context.

In a similar embodiment, if the content of the first browsing context has changed, such as if a user also visits new websites within the first browsing context and the second browsing context, when the second browsing context is closed, the history module 208 may merge the history of the second browsing context into the history of the first browsing context. In some embodiments, the history module 208 merges or appends the history of the first browsing context into the history of the second browsing context in response to the first browsing context being closed.

In certain embodiments, the history module 208 merges the second browsing history into the first browsing history, or vice versa, based on a timestamp associated with each history item, a ranking of the history items, and/or the like. For example, if a history item in the first browsing context was viewed at 3:01 PM and a history item in the second browsing context was viewed at 3:00 PM, when the second browsing context is closed, the history module 208 may copy the item with the 3:00 PM timestamp into the history of the first browsing context just before the history item with the 3:01 PM timestamp.

FIGS. 3A-D depict various embodiments of an interface 300-330 for integrating browser navigation between multiple browsing contexts. In one embodiment, the interface 300-330 comprises an interface for a web browser 302. In certain embodiments, the web browser 302 includes a back-navigation button 304 and a forward-navigation button 306, and presents content associated with a webpage within a first browsing context. The content may include one or more hyperlinks 308 associated with specific portions of the content. For example, as depicted, the term "consectetur" 308 is presented as a hyperlink, which a user may interact with to be directed to a new web page.

Figure 3A:
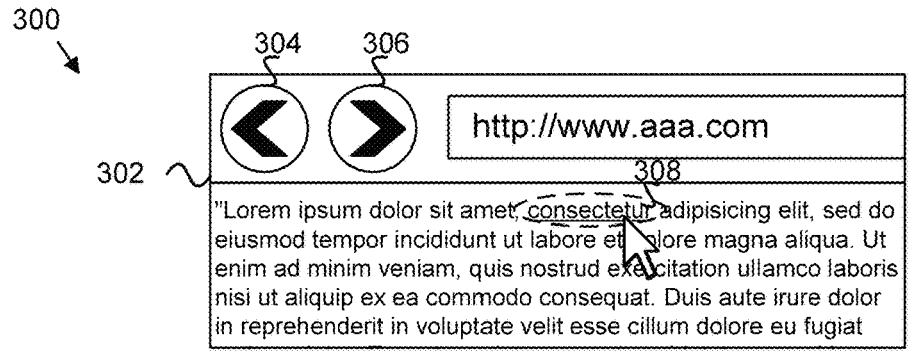
FIG. 3A is an illustration of one embodiment of an interface for integrating browser navigation between multiple browsing contexts.
Figure 3B:
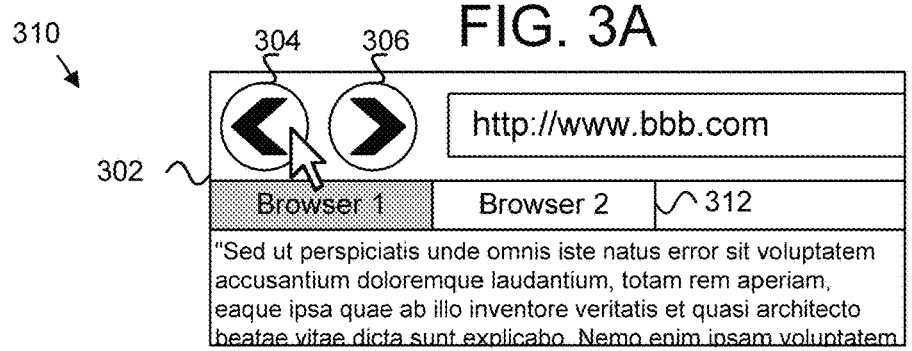
FIG. 3B is an illustration of one embodiment of another interface for integrating browser navigation between multiple browsing contexts.

As depicted in FIG. 3B, in response to a user clicking on the hyperlink for the term "consectetur" 308, the context module 202 may open a second browsing context to display content associated with the hyperlinked term "consectetur" 308. In this example, the second browsing context is a new browsing tab 312. In some embodiments, in response to the context module 202 opening the second browsing context from the first browsing context, the focus module 204 switches focus to the second browsing context.

Figure 3C:
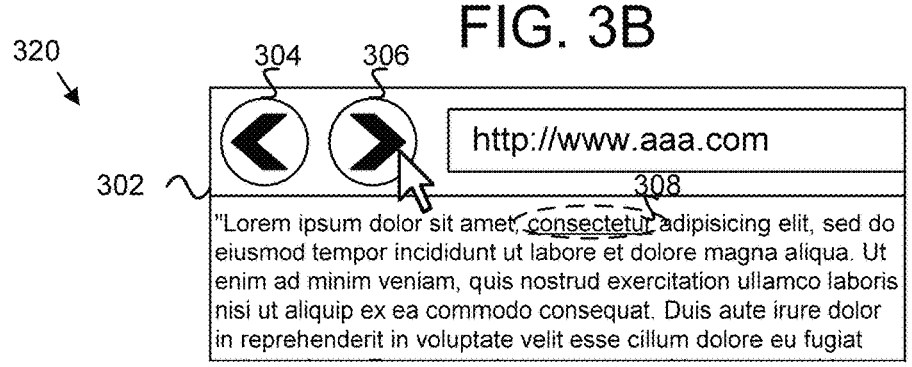
FIG. 3C is an illustration of one embodiment of yet another interface for integrating browser navigation between multiple browsing contexts.

In one embodiment, in response to a user interacting with the back-navigation button 304, the navigation module 206 returns focus to the first browsing context from the second browsing context. As depicted in FIG. 3C, the navigation module 206 may return focus to the first browsing context, or notify the focus module 204 to return focus to the first browsing context. Additionally, in the depicted embodiment, the navigation module 206 may close the second browsing context in response to receiving the back-navigation input.

Figure 3D:
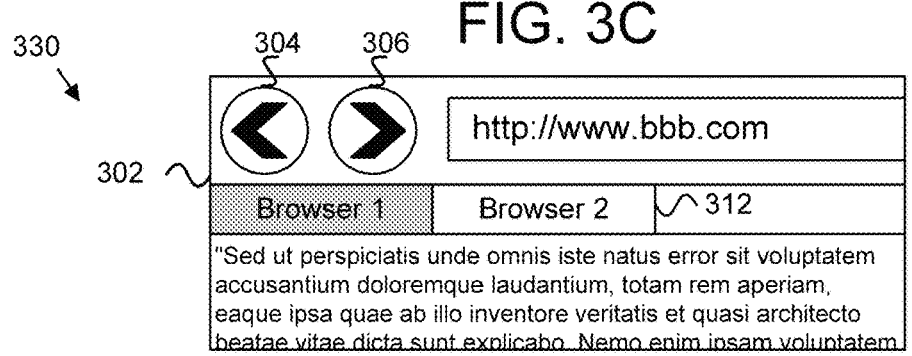
FIG. 3D is an illustration of one embodiment of an interface for integrating browser navigation between multiple browsing contexts.

In certain embodiments, as depicted in FIG. 3D, the navigation module 206 may reopen the second browsing context in response to receiving a forward-navigation input when a user interacts with a forward-navigation button 306. In one embodiment, the navigation module 206 notifies the context module 202 to reopen the second browsing context. In such an embodiment, the focus module 204 returns focus to the second browsing context in response to the context module 206 reopening the second browsing context.

In certain embodiments, the history module 208 assigns a browsing history associated with the first browsing context to the second browsing context in response to the context module 202 opening the second browsing context. Thus, in FIG. 3B, when the second browsing context is opened by the context module 202, the history module 208 may assign the web address of the first browsing context, "http://www.aaa.com," to the history of the second browsing context.

Similarly, in FIG. 3C, when the second browsing context is closed in response to the navigation module 206 receiving a back-navigation input, the history module 208 may copy the browsing history for the second browsing context to the browsing history of the first browsing context. For example, the history module 208 may append the web address of the second browsing context, "http://www.bbb.com," to the browsing history of the first browsing context in response to the navigation module 206 closing the second browsing context.

Figure 4:
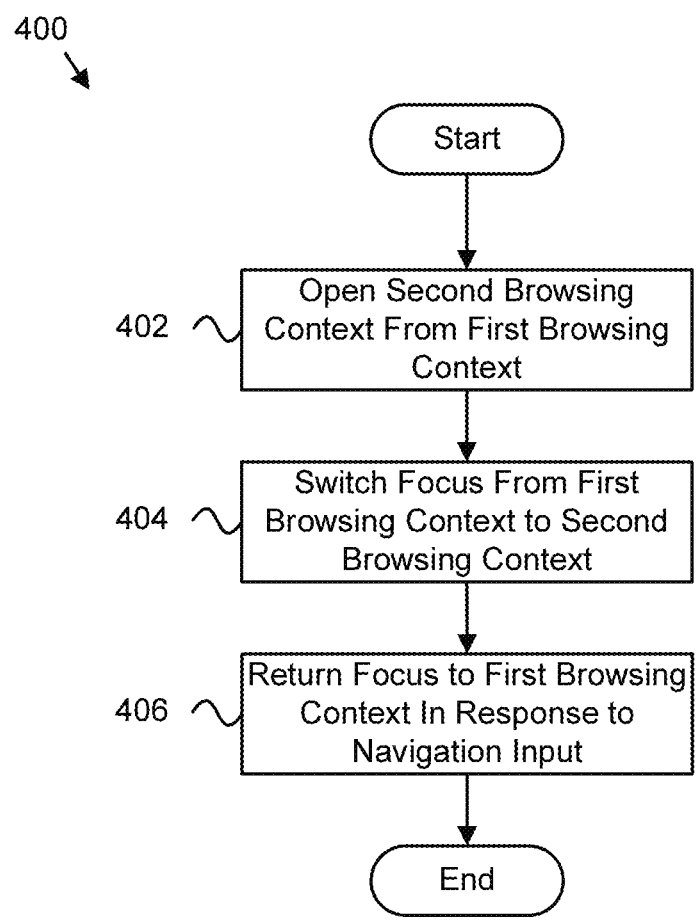
FIG. 4 is a schematic flow chart diagram illustrating one embodiment of a method for integrating browser navigation between multiple browsing contexts.

FIG. 4 depicts one embodiment of a method 400 for integrating browser navigation between multiple browsing contexts. In one embodiment, the method 400 begins and a context module 202 opens 402 a second browsing context from a first browsing context. The focus module 204, in certain embodiments, switches 404 focus from the first browsing context to the second browsing context in response to the context module 202 opening the second browsing context. In a further embodiment, the navigation module 206 returns 406 focus to the first browsing context in response to receiving browser navigation input in the second browsing context, such as a back-navigation input, and the method 400 ends.

Figure 5:
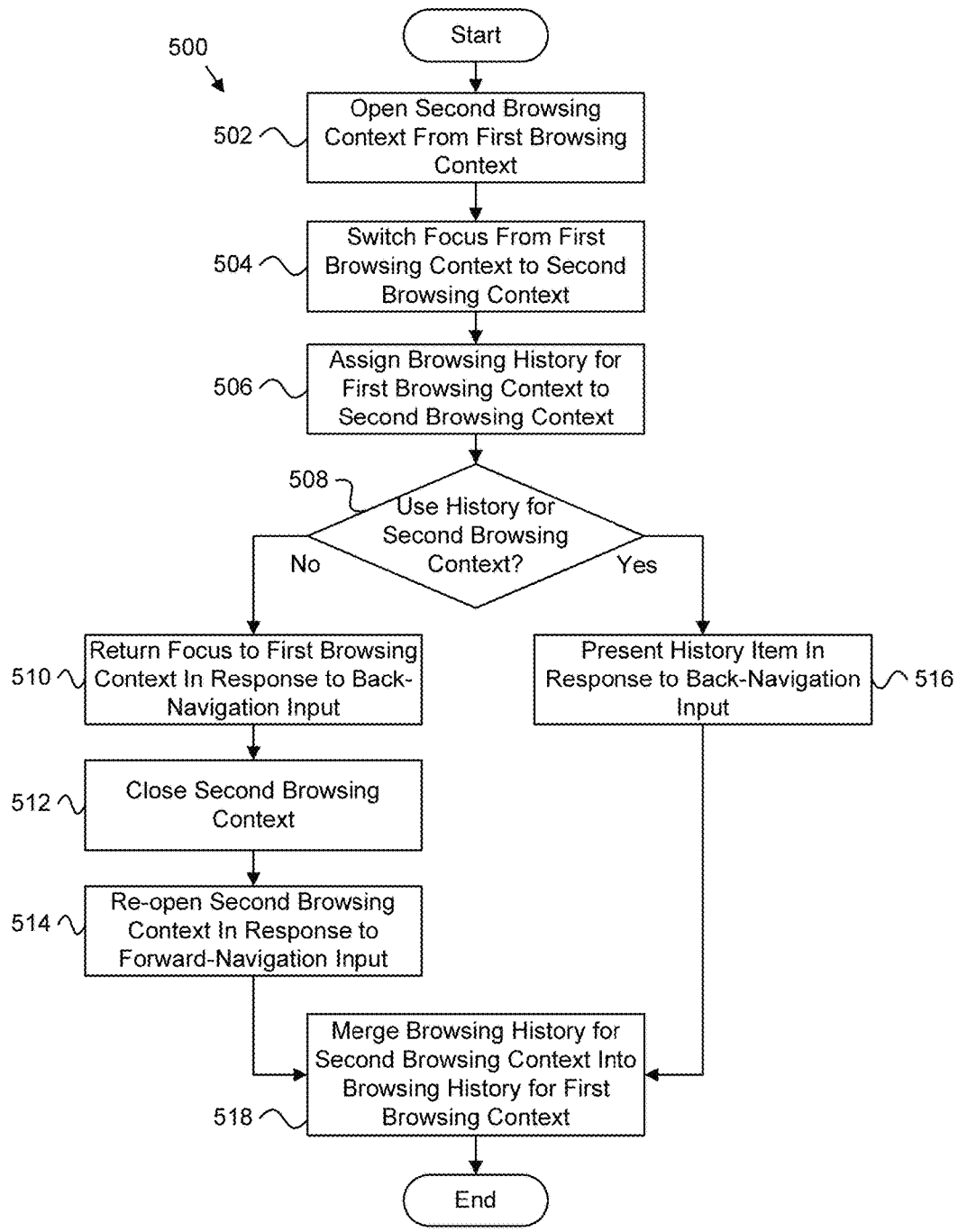
FIG. 5 is a schematic flow chart diagram illustrating one embodiment of another method for integrating browser navigation between multiple browsing contexts.

FIG. 5 depicts one embodiment of another method 500 for integrating browser navigation between multiple browsing contexts. In one embodiment, the method 500 begins and the context module 202 opens 502 a second browsing context from a first browsing context. The focus module 204, in certain embodiments, switches 504 focus from the first browsing context to the second browsing context in response to the context module 202 opening the second browsing context.

In one embodiment, the history module 208 assigns 506 a browsing history for the first browsing context to the browsing history for the second browsing context. In certain embodiments, the navigation module 206, in response to receiving a back-navigation input, determines 508 whether to use the browsing history for the second browsing context, i.e., whether to present content associated with a history item within the second browsing context or to return focus to the first browsing context. If the navigation module 206 determines 508 to use the browsing history for the second browsing context, the navigation module 206 presents 516 content associated with the history item (e.g., such as a website associated with a web address stored in the browsing history).

If the navigation module 206 determines 508 not to use the browsing history for the second browsing context, the navigation module 206 may return 510 focus to the first browsing context in response to the back-navigation input. In certain embodiments, the navigation module 206 closes 512 the second browsing context in response to receiving the back-navigation input and returns focus to the first browsing context. In another embodiment, the navigation module 206 reopens 514 the second browsing context in response to receiving a forward-navigation input in the first browsing context and switches focus to the second browsing context. In some embodiments, the history module 208 merges 518 the browsing history of the second browsing context into the browsing history of the first browsing context in response to the second browsing context being closed, and the method 500 ends.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
    opening, by a processor, a second browsing context from a first browsing context, the second browsing context opened responsive to selecting a link in the first browsing context;
    copying a navigation history from the first browsing context to a navigation history of the second browsing context in response to opening the second browsing context;
    switching focus from the first browsing context to the second browsing context responsive to opening the second browsing context;
    returning focus to the first browsing context from the second browsing context in response to receiving a back-navigation browser input in the second browsing context if content for the first browsing context has not changed when the back-navigation browser input is received and if the content for the first browsing context corresponds to an item in the navigation history of the second browsing context associated with the back-navigation browser input that is copied from the navigation history of the first browsing context when the second browsing context is opened; and
    merging the navigation history of the second browsing context into the navigation history of the first browsing context in response to the second browsing context being closed such that the navigation history of the second browsing context becomes part of the navigation history of the first browsing context, the navigation histories being merged based on a timestamp associated with each item in the navigation histories.

2. The method of claim 1, further comprising assigning a navigation history associated with the first browsing context to a navigation history associated with the second browsing context.

3. The method of claim 2, further comprising, in response to a navigation input, presenting content from an item in the navigation history assigned to the second browsing context instead of returning focus to the first browsing context, the navigation input comprising one of a back-navigation and a forward-navigation.

4. The method of claim 1, further comprising appending a navigation history associated with the second browsing context to a navigation history associated with the first browsing context in response to returning focus to the first browsing context from the second browsing context.

5. The method of claim 1, further comprising switching focus to the second browsing context from the first browsing context in response to receiving a forward-navigation input in the first browsing context.

6. The method of claim 1, further comprising closing the second browsing context in response to receiving the back-navigation browser input.

7. The method of claim 6, further comprising reopening the second browsing context in response to receiving a forward-navigation input in the first browsing context.

8. The method of claim 1, wherein the first and second browsing contexts comprise Internet browsing contexts such that website content is presented in the first and second browsing contexts.

9. The method of claim 1, wherein the first and second browsing contexts comprise one of a browsing window and a browsing tab within a browsing window.

10. An apparatus comprising:
a processor;
a memory that stores code executable by the processor, the code comprising:
code that opens a second browsing context from a first browsing context, the second browsing context opened responsive to selecting a link in the first browsing context;
code that copies a navigation history from the first browsing context to a navigation history of the second browsing context in response to opening the second browsing context;
code that switches focus from the first browsing context to the second browsing context responsive to opening the second browsing context;
code that returns focus to the first browsing context from the second browsing context in response to receiving a back-navigation browser input in the second browsing context if content for the first browsing context has not changed when the back-navigation browser input is received and if the content for the first browsing context corresponds to an item in the navigation history of the second browsing context associated with the back-navigation browser input that is copied from the navigation history of the first browsing context when the second browsing context is opened; and
code that merges a navigation history of the second browsing context into a navigation history of the first browsing context in response to the second browsing context being closed such that the navigation history of the second browsing context becomes part of the navigation history of the first browsing context, the navigation histories being merged based on a timestamp associated with each item in the navigation histories.

11. The apparatus of claim 10, wherein the code further:
assigns a navigation history associated with the first browsing context to a navigation history associated with the second browsing context; and
presents content from an item in the navigation history assigned to the second browsing context in response to a navigation input instead of returning focus to the first browsing context, the navigation input comprising one of a back-navigation and a forward-navigation.

12. The apparatus of claim 10, wherein the code further appends a navigation history associated with the second browsing context to a navigation history associated with the first browsing context in response to returning focus to the first browsing context from the second browsing context.

13. The apparatus of claim 10, wherein the code further switches focus to the second browsing context from the first browsing context in response to receiving a forward-navigation input in the first browsing context.

14. The apparatus of claim 10, wherein the code further closes the second browsing context in response to receiving the back-navigation browser input.

15. The apparatus of claim 14, wherein the code further reopens the second browsing context in response to receiving a forward-navigation input in the first browsing context.

16. A program product comprising a non-transitory computer readable storage medium that stores code executable by a processor to perform:
opening a second browsing context from a first browsing context, the second browsing context opened responsive to selecting a link in the first browsing context;
copying a navigation history from the first browsing context to a navigation history of the second browsing context in response to opening the second browsing context;
switching focus from the first browsing context to the second browsing context responsive to opening the second browsing context;
returning focus to the first browsing context from the second browsing context in response to receiving a back-navigation browser input in the second browsing context if content for the first browsing context has not changed when the back-navigation browser input is received and if the content for the first browsing context corresponds to an item in the navigation history of the second browsing context associated with the back-navigation browser input that is copied from the navigation history of the first browsing context when the second browsing context is opened; and
merging the navigation history of the second browsing context into the navigation history of the first browsing context in response to the second browsing context being closed such that the navigation history of the second browsing context becomes part of the navigation history of the first browsing context, the navigation histories being merged based on a timestamp associated with each item in the navigation histories.

* * * * *